United States Patent
Xu et al.

(10) Patent No.: US 10,240,728 B2
(45) Date of Patent: Mar. 26, 2019

(54) MULTIFUNCTION PORTABLE UTILITY LIGHT

(71) Applicant: FORD GLOBAL TECHNOLOGIES, LLC, Dearborn, MI (US)

(72) Inventors: Wei Xu, Nanjing (CN); Yun Shin Lee, Shelby Township, MI (US); Daniel Howard Weckstein, West Bloomfield, MI (US); Robert Ralph Armitage, Jr., Howell, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/606,795

(22) Filed: May 26, 2017

(65) Prior Publication Data
US 2018/0340660 A1   Nov. 29, 2018

(51) Int. Cl.
| F21V 33/00 | (2006.01) |
| F21L 4/00 | (2006.01) |
| B60Q 1/30 | (2006.01) |
| B60Q 3/35 | (2017.01) |
| B60Q 1/00 | (2006.01) |
| B60Q 1/26 | (2006.01) |

(52) U.S. Cl.
CPC ............... *F21L 4/00* (2013.01); *B60Q 1/30* (2013.01); *B60Q 1/302* (2013.01); *B60Q 3/35* (2017.02); *B60Q 1/00* (2013.01); *B60Q 1/26* (2013.01)

(58) Field of Classification Search
CPC ...... B60Q 7/00; B60Q 1/2696; B60Q 1/2615; B60Q 1/2607; B60Q 1/486
See application file for complete search history.

(56) References Cited

U.S. PATENT DOCUMENTS

| 4,823,241 | A | 4/1989 | Trattner |
| 5,521,806 | A | 5/1996 | Hutzel et al. |
| 6,286,976 | B1* | 9/2001 | Chopra ............... B60Q 3/74 315/77 |
| 7,090,371 | B1* | 8/2006 | Bonar ............... B60Q 1/0491 307/10.8 |
| 7,404,372 | B2 | 7/2008 | Aasgaard |
| 7,621,662 | B1 | 11/2009 | Colbert |
| 9,441,832 | B2 | 9/2016 | Bushee |
| 9,862,307 | B2* | 1/2018 | Parvaresh ............... B60Q 1/52 |
| 2012/0262933 | A1 | 10/2012 | Larsson |
| 2017/0080854 | A1* | 3/2017 | Medina Luna ......... B60Q 3/51 |
| 2017/0088047 | A1* | 3/2017 | Parvaresh ............... B60Q 1/52 |
| 2017/0234525 | A1* | 8/2017 | Cate .................. F21V 23/0407 362/190 |

FOREIGN PATENT DOCUMENTS

DE          10147288 A1     7/2003

OTHER PUBLICATIONS

English Machine Translation of DE10147288A1.

* cited by examiner

*Primary Examiner* — Ali Alavi
(74) *Attorney, Agent, or Firm* — Vichit Chea; King & Schickli, PLLC

(57) ABSTRACT

An apparatus includes a motor vehicle component having a receiver and a portable utility light that is releasably held in that receiver. The portable utility light includes a housing having a lens and an external reflector and a light source held in the housing. A method of providing a motor vehicle with a multi function light source is also disclosed.

14 Claims, 4 Drawing Sheets

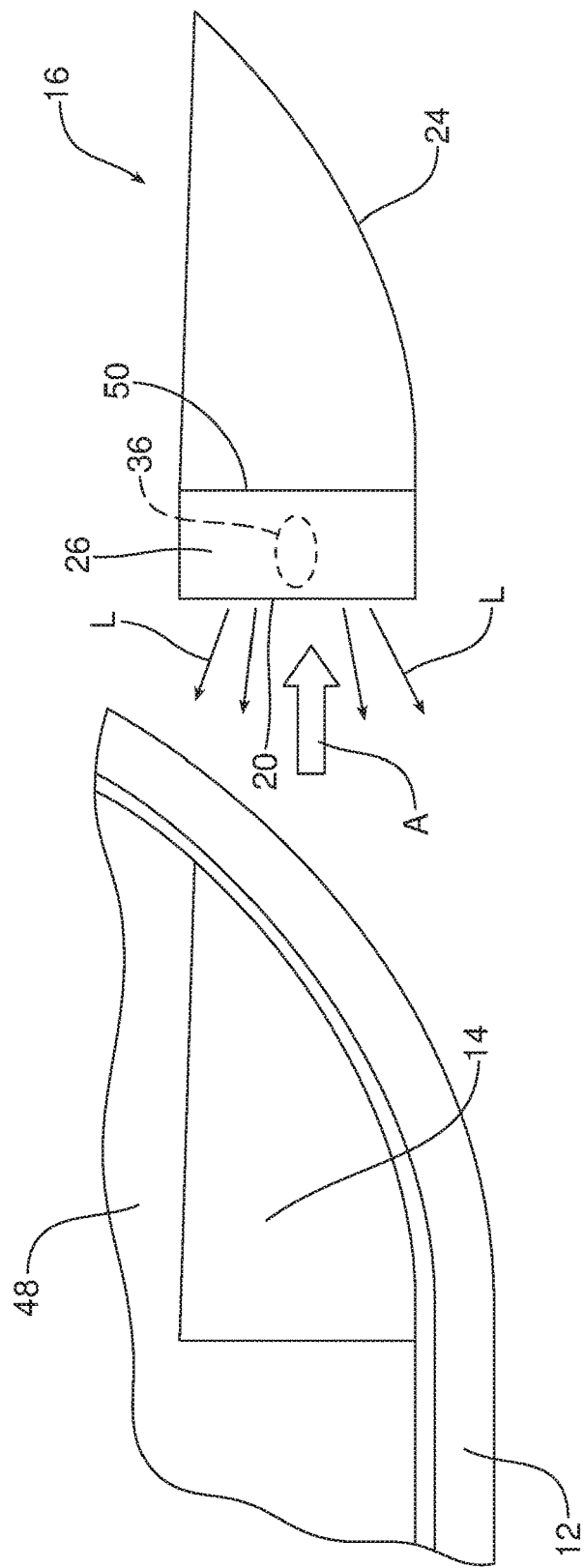

MULTIFUNCTION PORTABLE UTILITY LIGHT

TECHNICAL FIELD

This document relates generally to the motor vehicle equipment field and, more particularly, to a portable utility light that may be carried on a closure such as a liftgate or tailgate of a motor vehicle and may also serve multiple functions.

BACKGROUND

Motor vehicle operators often use their motor vehicles within structures or at night when ambient light conditions restrict sight for completing a task at hand. This document relates to a new and improved portable utility light that is convenient to utilize and is adapted to serve multiple functions for the convenience and benefit of the motor vehicle operator.

SUMMARY

In accordance with the purposes and benefits described herein, an apparatus is provided comprising a motor vehicle component including a receiver and a portable utility light releasably held in that receiver. The portable utility light includes a housing, having a lens and an external reflector, and a light source held in that housing.

The apparatus may further include a power source held in that housing. That power source may comprise a rechargeable battery the apparatus may also include an activation switch between the battery and the light source. Further, the apparatus may include a lock securing the portable utility light in the receiver.

Still further, the apparatus may include a first battery charging connector carried on the motor vehicle component and a second battery charging connector carried on the housing. When the portable utility light is held in the receiver, the first battery charging connector is mated with the second battery charging connector to allow for charging the battery carried in the housing of the portable utility light.

In at least one of many possible embodiments, the motor vehicle component is a closure of the motor vehicle. Thus, for example, the motor vehicle component may be a liftgate, tailgate or other door structure of a motor vehicle. That liftgate may include a trim panel and the receiver may be provided in the trim panel. In at least one of the many possible embodiments, the external reflector of the housing may be exposed along the trim panel when the portable light assembly is held in the receiver.

In accordance with yet another aspect, a motor vehicle is provided incorporating the apparatus as described.

In accordance with still another aspect, a method is provided. That method comprises the steps of locating a receiver on a motor vehicle component, releasably securing a portable utility light in the receiver and configuring the utility light with a light source functioning as a dome light and a flashlight.

Still further, the method may include the step of orienting an external reflector on the portable utility light to be exposed when the portable utility light is secured in the receiver. Further, the method may include the step of powering the light source with a battery carried on the portable utility light.

Further, the method may include the step of charging the battery when the portable utility light is secured in the receiver. Further, the method may include the step of configuring the light source with an actuation switch carried on the portable utility light.

Still further, when the motor vehicle component holding the portable utility light is a liftgate, the method may further include the step of positioning the receiver in the liftgate so that the external reflector is visible from behind the motor vehicle when the liftgate is opened. In addition the method may include activating the light source when the liftgate is opened.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof. In the drawing figures:

FIGS. 3a and 3b are schematic views illustrating how the portable utility light may be held in the receiver and used as a dome light or removed from the receiver and used as a flashlight.

Reference will now be made in detail to the present preferred embodiments of the apparatus and method, examples of which are illustrated in the accompanying drawing figures.

DETAILED DESCRIPTION

Figure 1:
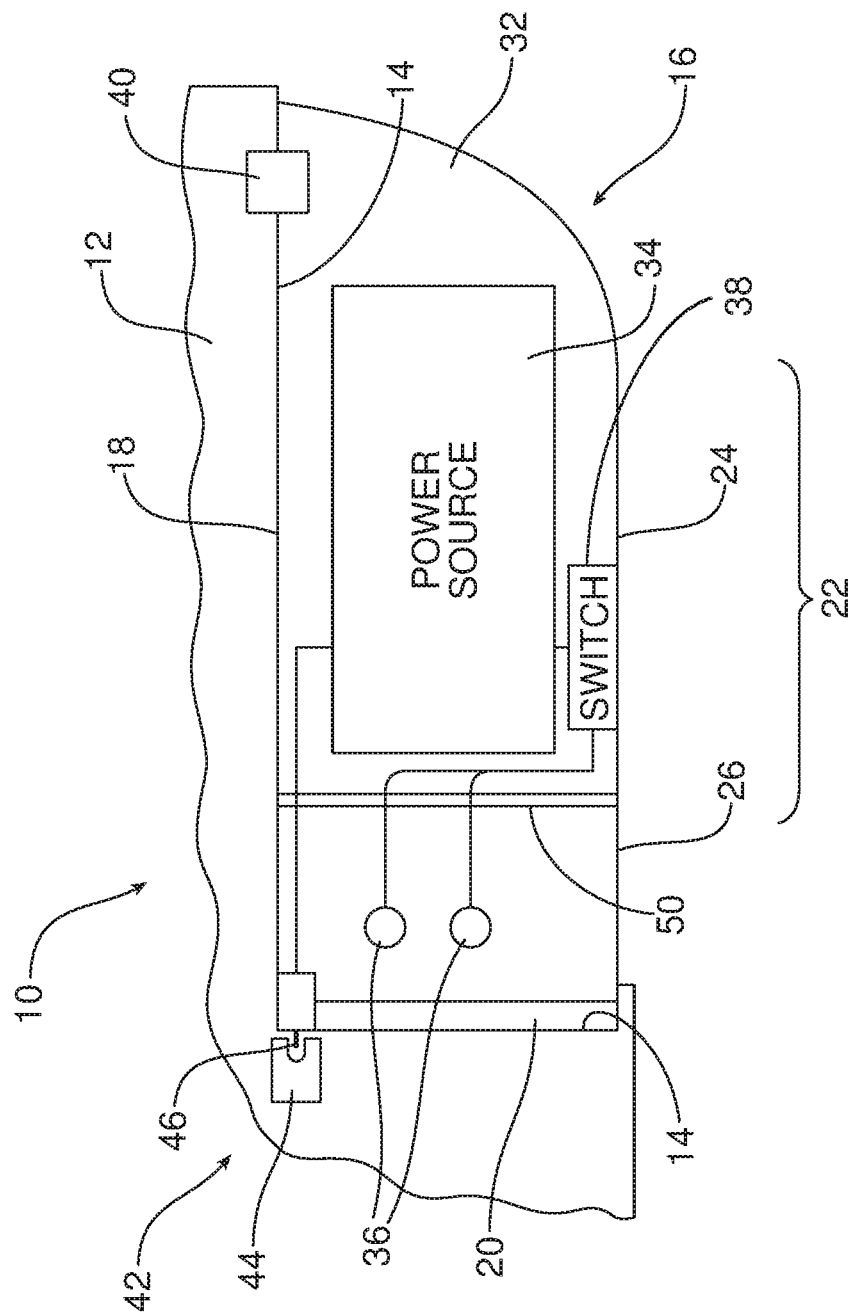
FIG. 1 is a schematic illustration of the apparatus showing the portable utility light held in a receiver of the motor vehicle component.
Figure 2:
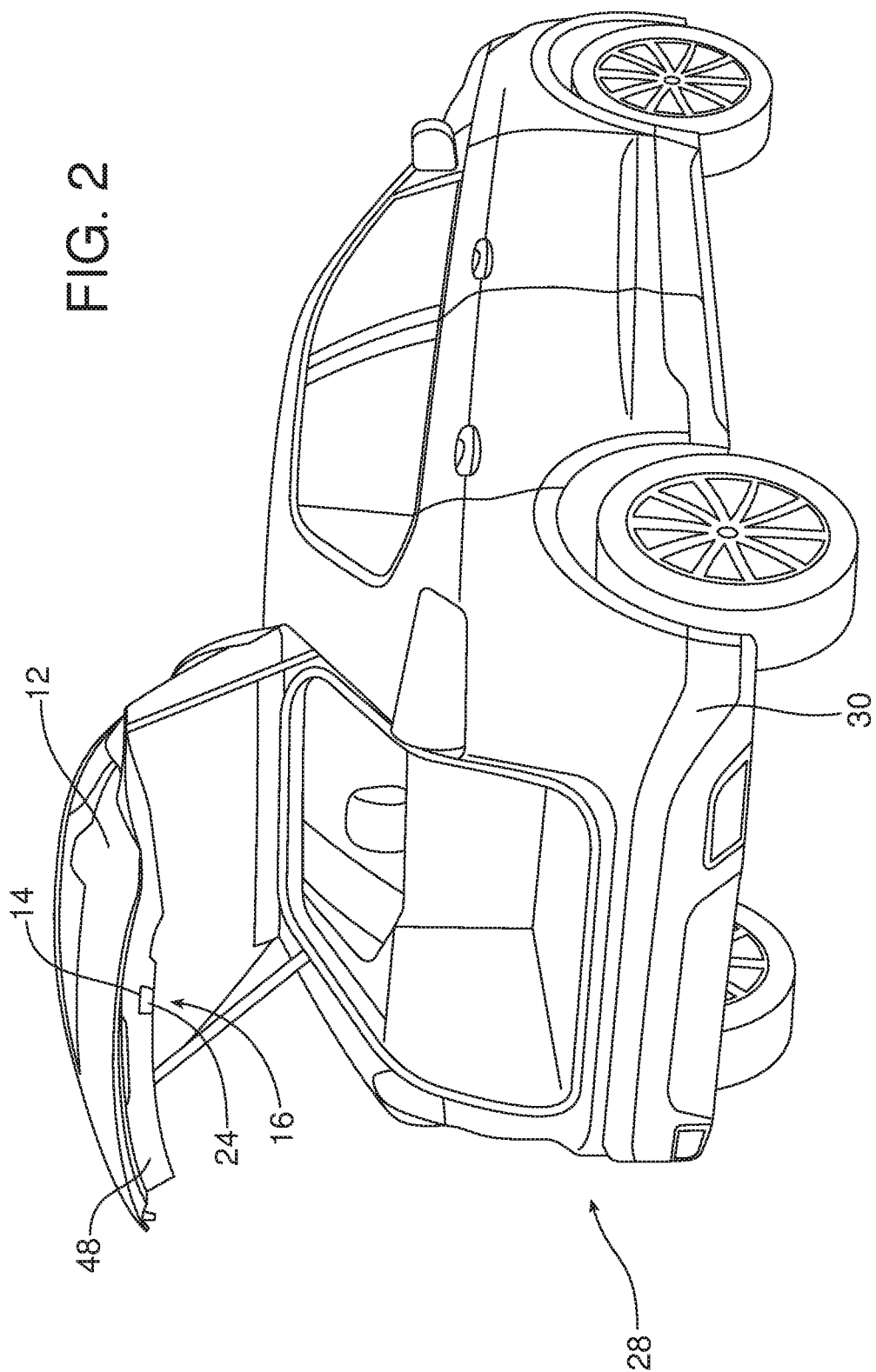
FIG. 2 is a perspective view of a motor vehicle equipped with the apparatus illustrated in FIG. 1 and showing how the external reflector of the housing of the portable utility light is exposed and oriented to be visible from behind the motor vehicle when the liftgate is opened and thereby reflect headlight illumination from an approaching vehicle back toward the driver of the approaching vehicle.

Reference is now made to FIGS. 1, 2, 3a and 3b illustrating the apparatus 10. The apparatus 10 includes a motor vehicle component 12 including a receiver 14. A portable utility light 16 is releasably held in the receiver 14. In the illustrated embodiment, the portable utility light 16 includes a housing 18 having a lens 20 and an external reflector 22. In the illustrated embodiment, the external reflector 22 comprises a dual injection molded component having a first section 24 that functions as a red reflector and a second section 26 that functions as milky white lens when the portable utility light 16 functions as a dome light for illuminating the storage area 28 of the motor vehicle 30 as illustrated in FIG. 2.

As best illustrated in FIG. 1, the portable utility light 16 includes an internal cavity 32 within the housing 18. A rechargeable power source in the form of a battery 34 is carried within the internal cavity 32.

The portable utility light 16 also includes a light source 36 held in the internal cavity 32 adjacent the clear forward lens 20 and the white lens 26. In the illustrated embodiment, the light source 36 comprises two light emitting diodes (LEDs). Here it should be appreciated that other light sources of a type known in the art may be utilized if desired. An activation switch 38 is wired between the power source 34 and the light source 36. Thus, the activation switch 38 may be utilized to turn the light source 36 on or off as desired.

The apparatus 10 also includes a lock 40 to releasably secure the portable utility light 16 in the receiver 14. That lock 40 may comprise any structure of a type known in the art known to be useful for this intended purpose.

The apparatus 10 also includes a battery charging feature, generally designated by reference numeral 42. That battery charging feature 42 includes a first battery charging connector 44 carried on the motor vehicle component 12 and a second battery charging connector 46 carried on the housing 18. When the portable utility light 16 is properly seated and held in the receiver 14 by the lock 40, the first battery charging connector 44 is mated with the second battery charging connector 46 to allow for charging of the battery 34. In this way, the battery 42 may be maintained in a fully charged state, ready to power the light source 36 for remote use whenever needed.

As best illustrated in FIG. 2, in one possible embodiment of the apparatus 10, the motor vehicle component 12 is a liftgate and the receiver 14 is provided in the trim panel 48 of the liftgate. When the liftgate/motor vehicle component 12 is fully opened and the portable utility light 16 is properly seated and held in the receiver 14 by the lock 40, the red reflector portion 24 of the housing is exposed and oriented so as to reflect the headlights of an oncoming vehicle back toward that vehicle driver. Thus, it should be appreciated that the red reflector portion 24 of the portable utility light 16 serves a safety function by increasing the visibility of the motor vehicle when the liftgate/motor vehicle component 12 is opened.

Figure 3A:
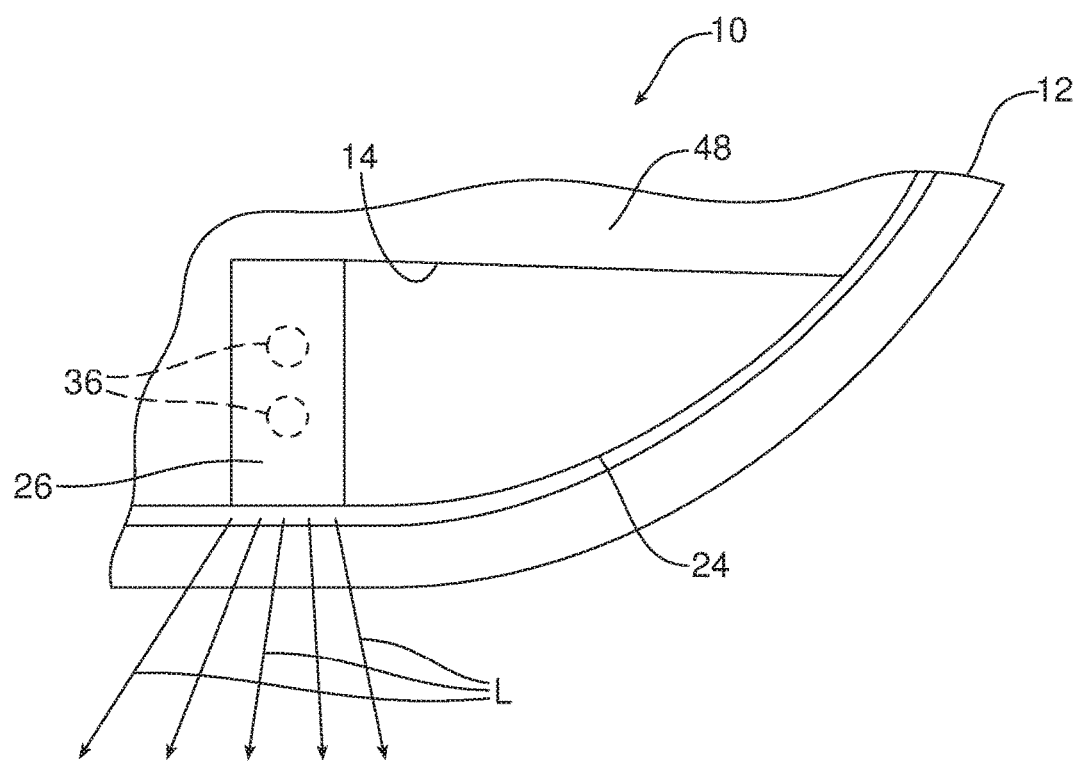

As should also be appreciated from viewing FIGS. 1, 2 and 3a, when the liftgate/motor vehicle component 12 is opened, the activation switch 38 may be utilized to turn the light source 36 on. When this is done, light L projects through the white lens 26 of the housing 18 down into the storage area 28 of the motor vehicle 30 providing useful light for an operator seeking to complete a task in the storage area in limited ambient light conditions.

When an operator needs lighting at a remote location such as, for example, to change a flat tire, the operator may release the lock 40 and slide (note action arrow A) or otherwise remove the portable utility light 16 from the receiver 14 (see FIGS. 1 and 3b). The activation switch 38 may be utilized to turn the light source 36 on so that illumination or light L from the light source streams through the clear forward lens 20 allowing the portable utility light 16 to function as a flashlight. A reflector 50 may be provided within the housing 18 to enhance the light directed through the front lens 20 and allow better lighting at the desired remote location such as the flat tire. After use, the portable utility light 16 may be reengaged with and locked in the receiver 14, by means of the lock 40. The light source 36 may be turned off at any time using the activation switch 38. Once the portable utility light 16 is returned and locked in the receiver 14, the battery charging feature 42 functions to maintain the rechargeable battery 34 within the housing 18 of the portable utility light 16 in a fully charged state so that it will be ready for the next time it is needed.

Consistent with the above description, a method is provided including the steps of locating a receiver 14 on a motor vehicle component 12 such as the trim panel 48 of a liftgate, releasably securing a portable utility light 16 in the receiver and configuring that portable utility light 16 with a light source 36 capable of functioning as a dome light and a flashlight.

The method may further include the step of orienting a reflector 22 on the portable utility light 16 to be exposed when the portable utility light is secured in the receiver 14. More specifically, when the motor vehicle component 12 is a liftgate, the method may include positioning the receiver 14 in the liftgate so that the reflector 22, and more particularly the red reflector portion 24 thereof, is visible from behind the motor vehicle when the liftgate is opened.

The method may also include the step of powering the light source 36 with a battery 34 carried inside the internal cavity 32 of the housing 18 of the portable utility light 16. Further, the method may include the step of charging the battery 34 when the portable utility light 16 is secured within the receiver 14. In addition, the method may include configuring the light source 36 with an activation switch 38 carried on the portable utility light 16.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
a liftgate including a trim panel and a receiver provided in said trim panel; and
a portable utility light releasably held in said receiver, said portable utility light including a housing, having a lens and an external reflector, and a light source held in said housing wherein said external reflector is exposed along said trim panel when said portable utility light is held in said receiver.

2. The apparatus of claim 1, including a power source held in said housing.

3. The apparatus of claim 2, wherein said power source is a battery.

4. The apparatus of claim 3, including an activation switch between said battery and said light source.

5. The apparatus of claim 4, including a lock securing said portable utility light in said receiver.

6. The apparatus of claim 5, including a first battery charging connector carried on said liftgate and a second battery charging connector carried on said housing whereby when said portable utility light is held in said receiver, said first battery charging connector is mated with said second battery charging connector charging said battery.

7. A motor vehicle incorporating the apparatus of claim 1.

8. A method, comprising:
locating a receiver on a closure of a motor vehicle;
releasably securing a portable utility light on said receiver; and
configuring said portable utility light with a light source functioning as a dome light and a flash light.

9. The method of claim 8, including orienting an external reflector on said portable utility light to be exposed when said portable utility light is secured in said receiver.

10. The method of claim 9, including powering said light source with a battery carried in said portable utility light.

11. The method of claim 10, including charging said battery when said portable utility light is secured in said receiver.

12. The method of claim 11, including configuring said light source with an activation switch carried on said portable utility light.

13. The method of claim 12, wherein said closure is a liftgate, said method further including positioning said receiver in said liftgate so that said external reflector is visible from behind said motor vehicle when said liftgate is opened.

14. The method of claim 13, including activating said light source when said liftgate is opened.

* * * * *